(12) United States Patent
Yongzuo et al.

(10) Patent No.: US 9,509,196 B2
(45) Date of Patent: Nov. 29, 2016

(54) MOTOR

(71) Applicant: Nidec Corporation, Kyoto (JP)

(72) Inventors: Ba Yongzuo, Dalian (CN); Luan Baojun, Dalian (CN); Wang Xin, Dalian (CN); Kazunori Tategata, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 210 days.

(21) Appl. No.: 14/548,441

(22) Filed: Nov. 20, 2014

(65) Prior Publication Data

US 2015/0171712 A1 Jun. 18, 2015

(30) Foreign Application Priority Data

Dec. 12, 2013 (CN) .......................... 2013 1 0681351
Dec. 12, 2013 (CN) ..................... 2013 2 0822488 U

(51) Int. Cl.
*H02K 11/00* (2016.01)
*H02K 3/52* (2006.01)
*H02K 5/22* (2006.01)

(52) U.S. Cl.
CPC ........... *H02K 11/0094* (2013.01); *H02K 3/522* (2013.01); *H02K 11/30* (2016.01); *H02K 5/225* (2013.01); *H02K 2203/09* (2013.01); *H02K 2213/03* (2013.01)

(58) Field of Classification Search
CPC ..................... H02K 11/0094; H02K 2213/03; H02K 5/225; H02K 11/0073; H02K 11/30; H02K 2203/09; H02K 3/52; H02K 3/522; H02K 5/22
USPC .......................................................... 310/71
See application file for complete search history.

(56) References Cited

U.S. PATENT DOCUMENTS

| | | | |
|---|---|---|---|
| 6,577,029 B1* | 6/2003 | Weber ..................... | H02K 23/66 310/68 B |
| 6,914,356 B2* | 7/2005 | Yamamura ............... | H02K 3/50 310/71 |
| 8,729,755 B2 | 5/2014 | Nakagawa et al. | |
| 8,779,641 B2 | 7/2014 | Fujii et al. | |
| 2006/0068617 A1* | 3/2006 | Migita .................... | H02K 3/522 439/76.2 |
| 2006/0138883 A1* | 6/2006 | Yagai ..................... | H02K 3/522 310/71 |
| 2007/0080592 A1* | 4/2007 | Ohta ...................... | H02K 1/148 310/71 |
| 2007/0145838 A1* | 6/2007 | Uchitani ................ | H02K 3/522 310/68 B |
| 2007/0145839 A1* | 6/2007 | Kimura ................ | H02K 19/103 310/68 B |
| 2009/0255704 A1* | 10/2009 | Niwa ...................... | F04B 35/04 174/68.2 |
| 2011/0006625 A1 | 1/2011 | Fujii et al. | |

* cited by examiner

FOREIGN PATENT DOCUMENTS

CN 101926075 A 12/2010

*Primary Examiner* — Alex W Mok
(74) *Attorney, Agent, or Firm* — Keating & Bennett, LLP

(57) ABSTRACT

A motor includes a stator around which an armature coil is wound, a bus bar unit including a coil-connection bus bar electrically connected to the armature coil and an electronic-component-connection bus bar to which a plurality of electronic components is welded, and a bus bar holding member arranged to hold the bus bar unit. The electronic-component-connection bus bar includes an electronic component welding portion including a plurality of welding points at which the electronic components are welded to a leading end of the electronic component welding portion, a base portion held by the bus bar holding member, and a connection portion configured to interconnect the electronic component welding portion and the base portion. A distance between the welding points adjoining each other is larger than a width of a thinnest section of the connection portion.

12 Claims, 3 Drawing Sheets

FIG.3
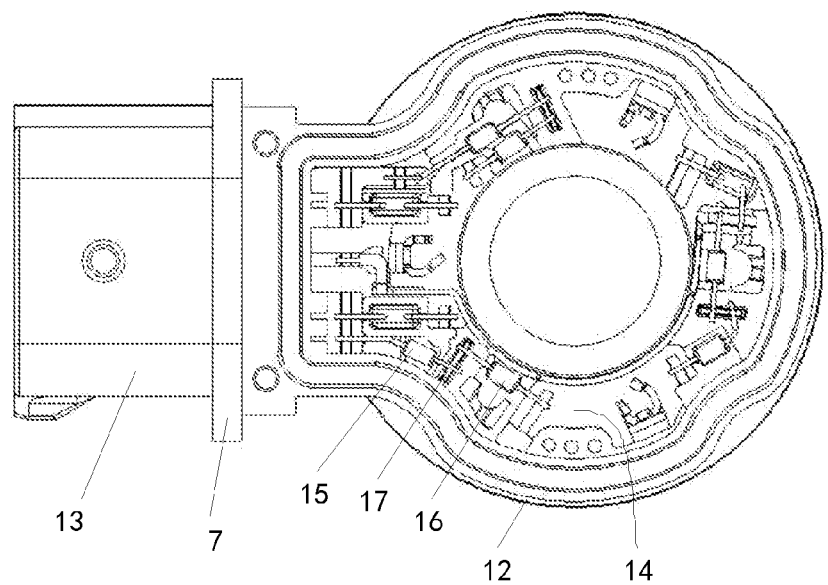
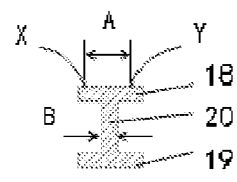
FIG.4A
FIG.4B
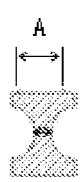
FIG.4C
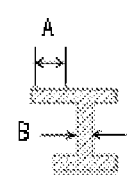
FIG.4D
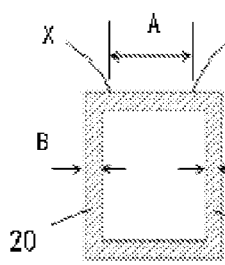
FIG.4E
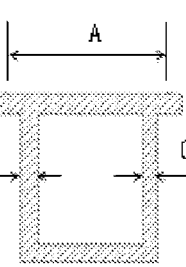
FIG.4F
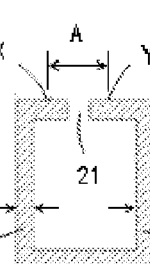
FIG.4G
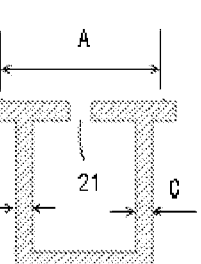
FIG.4H

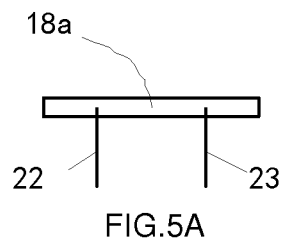
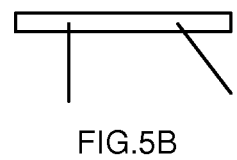
FIG.5A  FIG.5B
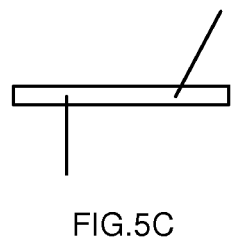
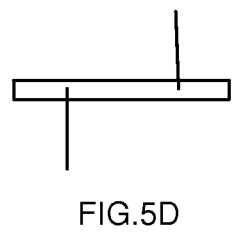
FIG.5C  FIG.5D
FIG.6
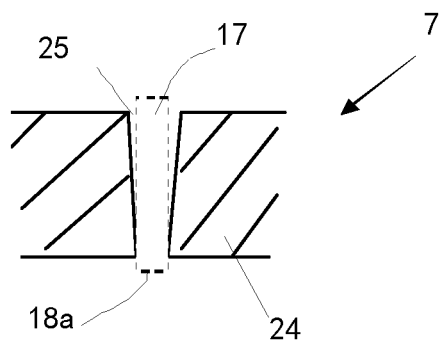

MOTOR

BACKGROUND OF THE INVENTION

1. Field of the Invention

The present invention relates to a motor and, more particularly, to a motor including a bus bar unit.

2. Description of the Related Art

A motor is disclosed in Chinese Laid-Open Publication No. CN 101926075A. The motor includes a bus bar unit and a bus bar holding member for holding the bus bar unit. The bus bar unit includes a plurality of coil-connection bus bars for supplying an electric current to coils and a plurality of electronic-part-connection bus bars to which a plurality of electronic parts are welded. The coil-connection bus bars and the electronic-part-connection bus bars are supported by the bus bar holding member. FIG. 1 is a perspective view showing an electronic-part-connection bus bar of a conventional motor. As shown in FIG. 1, an electronic-part-connection bus bar 53 includes an electronic-part-connection portion 533. Two electronic parts (e.g., resistors and/or capacitors) are welded to a leading end 533a of the electronic-part-connection portion 533.

In general, the heat generated during the operation of a motor is transferred to electronic parts. In that case, there is a possibility that lead wires of electronic parts connected to the electronic-part-connection bus bar 53 are deformed or disconnected by this heat. Particularly, the possibility of disconnection of lead wires grows higher when the electronic-part-connection bus bar is connected to a plurality of electronic parts. In case where a plurality of electronic parts is oriented in different directions, if an electronic part oriented in one direction is deformed, a bus bar is also deformed in one direction by a stress. Thus, an electronic part oriented in the other direction is deformed by a load applied thereto. This further increases the possibility of disconnection of lead wires.

Under the circumstances, there is a demand for a motor capable of preventing disconnection of lead wires of electronic parts.

SUMMARY OF THE INVENTION

Preferred embodiments of the present invention provide a motor capable of solving the problems mentioned above.

In accordance with an aspect of a preferred embodiment of the present invention, a motor includes a stator around which an armature coil is wound; a bus bar unit including a coil-connection bus bar electrically connected to the armature coil and an electronic-component-connection bus bar to which a plurality of electronic components is welded; and a bus bar holding member arranged to hold the bus bar unit, wherein the electronic-component-connection bus bar includes an electronic component welding portion including a plurality of welding points at which the electronic components are welded to a leading end of the electronic component welding portion, a base portion held by the bus bar holding member, and a connection portion configured to interconnect the electronic component welding portion and the base portion, a distance between the welding points adjoining each other being larger than a width of a thinnest section of the connection portion. With a structure in which an electronic-component-connection bus bar is configured to be readily deformed in different directions, it is possible to maintain a bonding strength and to prevent disconnection of lead wires.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a plan view showing a bus bar unit and a bus bar holding member of the motor shown in FIG. 2.

FIGS. 4A to 4H are sectional views showing different examples of electronic-component-connection bus bars of the motor shown in FIG. 2.

FIGS. 5A to 5D are bottom views showing electronic component welding portions of electronic-component-connection bus bars and lead wires of electronic components in the motor shown in FIG. 2.

FIG. 6 is a sectional view showing a portion of the bus bar holding member of the motor shown in FIG. 2.

DETAILED DESCRIPTION OF THE PREFERRED EMBODIMENTS

Preferred embodiments of motors according to the present invention will now be described with reference to the accompanying drawings. The drawings are not shown on a particular reduction scale. The preferred embodiments and the drawings described below are presented merely for the sake of convenience in description. The scope of the present invention is not limited to the preferred embodiments described below. Technical features of the preferred embodiments may be combined depending on the necessity.

In the following description, the term "axial direction" indicates the direction of a center axis 0-0' of a motor. The term "radial direction" indicates the direction of a radius extending from the center axis 0-0'. The term "upper" indicates the side at which a rotor is positioned in the axial direction. The term "lower" indicates the side at which a bus bar holding member is positioned in the axial direction.

Figure 1:
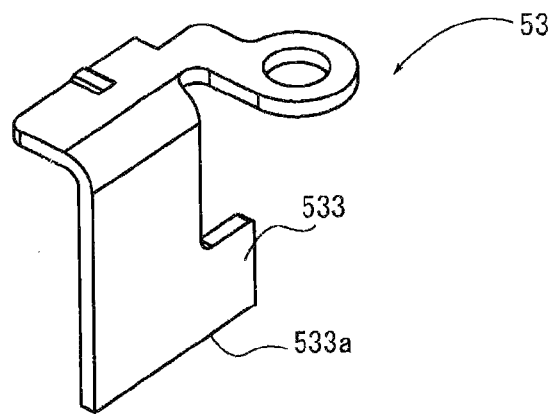
FIG. 1 is a perspective view showing an electronic-component-connection bus bar of a conventional motor.
Figure 2:
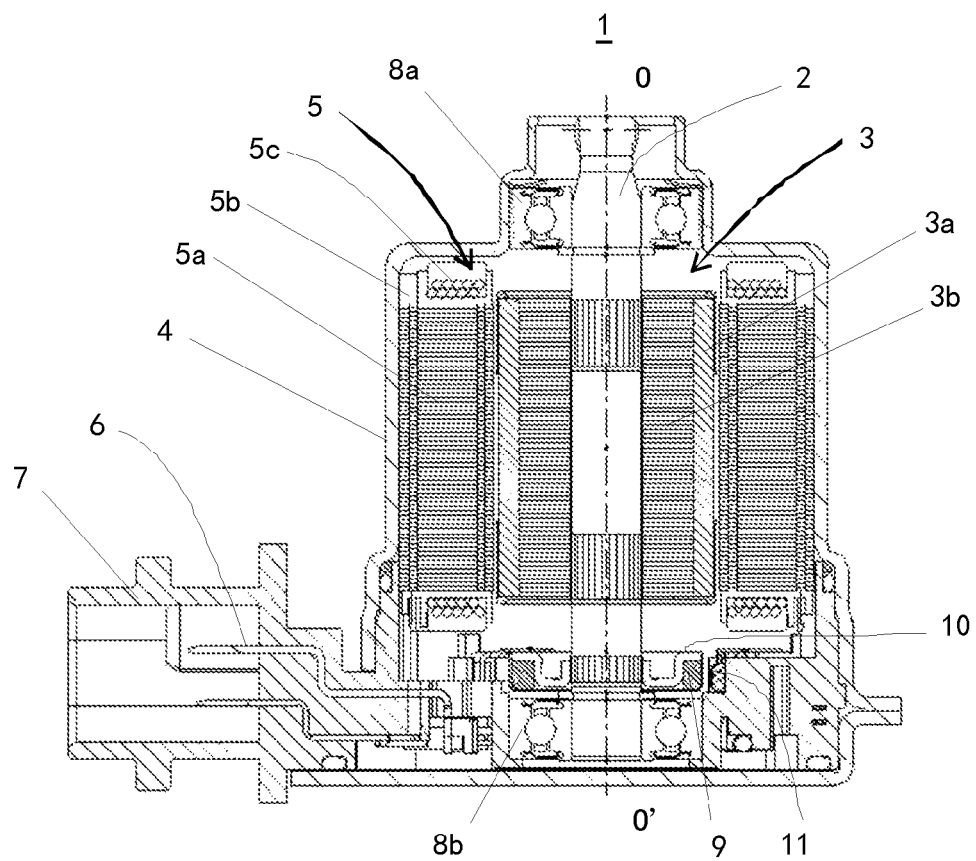
FIG. 2 is a sectional view showing a motor according to one preferred embodiment of the present invention.

FIG. 2 is a sectional view showing a motor according to a preferred embodiment of the present invention. The motor 1 preferably includes a shaft 2, a rotor 3, a housing 4, a stator 5, a bus bar unit 6, and a bus bar holding member 7. The shaft 2 has a rotation axis 0-0'. The rotor 3 is mounted to the shaft 2 and is configured to be rotated together with the shaft 2. The rotor 3 preferably includes a rotary magnet 3a and a rotor core 3b. The rotor core 3b is fixed to the shaft 2. The rotary magnet 3a is fixed to the outer circumferential surface of the rotor core 3b. The housing 4 has a cylindrical or substantially cylindrical shape about the rotation axis 0-0'. The stator 5 preferably includes a stator core 5a, an insulation member 5b, and armature coils 5c. The coils 5c are each preferably defined by a conductive wire wound around the stator core 5a through the insulation member 5b. The stator 5 is fixed to the inner circumferential surface of the housing 4 and is radially opposed to the rotor 3. The bus bar unit 6 and the bus bar holding member 7 are positioned below the rotor 3 and the stator 5. The upper portion of the housing 4 and the lower portion of the bus bar holding member 7 hold ball bearings 8a and 8b, respectively. The shaft 2 is rotatably supported by the ball bearings 8a and 8b.

The motor 1 preferably further includes a sensor magnet 9. The sensor magnet 9 is arranged below the rotor 3 and is held by a sensor yoke 10 fixed to the shaft 2. The bus bar holding member 7 preferably includes a plurality of Hall ICs 11 which is radially opposed to the sensor magnet 9. The Hall ICs are preferably arranged on the top surface of the bus bar holding member 7 and generate a Hall signal corresponding to the position of the sensor magnet 9.

The motor 1 may be, for example, a brushless motor applied to a transmission or a clutch of a motor vehicle.

FIG. 3 is a plan view showing the bus bar unit and the bus bar holding member of the motor shown in FIG. 2. The bus bar holding member 7 is preferably made of an electrically insulating material, e.g., a resin. The bus bar holding member 7 preferably includes a bus bar holding body portion 12 and a connector portion 13. As shown in FIG. 3, the bus bar holding body portion 12 includes, e.g., a circular or substantially circular shape when seen in a plan view. The connector portion 13 is positioned radially outward of the bus bar holding body portion 12. The bus bar holding body portion 12 preferably includes a bottom portion 14. A plurality of electronic components, e.g., a plurality of resistors 15 and a plurality of capacitors 16, are arranged on the bottom portion 14 of the bus bar holding body portion 12.

The bus bar unit 6 preferably includes a plurality of coil-connection bus bars (not shown) electrically connected to the coils 5c of the stator 5 and arranged to supply electric power to the coil 5c, and a plurality of electronic-component-connection bus bars 17 electrically connected to the electronic components. The electronic components, e.g., the resistors 15 and/or the capacitors 16, are welded to electronic component welding portions of the electronic-component-connection bus bars 17. The electronic-component-connection bus bars 17, the resistors 15 and the capacitors 16 preferably define a Hall IC circuit. The Hall IC circuit is a circuit that supplies electric power to the Hall ICs (positioned in the top portion of the bus bar holding body portion 12) and outputs Hall signals from the Hall ICs 11 to a control device (not shown). As shown in FIG. 3, lead wires of the electronic components may be welded to the electronic-component-connection bus bars 17 along different directions or may be welded to the electronic-component-connection bus bars 17 along the same or substantially the same direction.

FIGS. 4A to 4H are sectional views showing different examples of the electronic-component-connection bus bars 17 of the motor 1 shown in FIG. 2. FIGS. 5A to 5D are bottom views showing the electronic component welding portions of the electronic-component-connection bus bars and the lead wires of the electronic components in the motor 1 shown in FIG. 2. In each of FIGS. 5A to 5D, there are shown a leading end 18a of an electronic component welding portion 18 and two adjoining lead wires 22 and 23 which are welded to the leading end 18a are shown. As shown in FIG. 4A, each of the electronic-component-connection bus bars 17 preferably includes an electronic component welding portion 18, a base portion 19, and a connection portion 20 arranged to interconnect the electronic component welding portion 18 and the base portion 19. A plurality of electronic components is preferably welded to the axial upper end of the electronic component welding portion 18, such that a plurality of welding points is formed. In FIGS. 4A to 4H, the distance A between adjoining welding points X and Y is larger than the width B of a thinnest section of the connection portion 20 or the sum B+C of the widths of thinnest sections of the adjoining connection portions. Each of the electronic-component-connection bus bars configured in this way is easily deformable and is capable of maintaining the bonding strength of the electronic components to each of the electronic-component-connection bus bars and preventing disconnection of the lead wires. Particularly, in case where a plurality of electronic components is arranged along different directions, each of the electronic-component-connection bus bars having this structure is easily deformable in a plurality of directions and is capable of preventing disconnection of the lead wires of the electronic components arranged in different directions.

Referring to FIG. 4A, the welding points X and Y are positioned in the opposite lateral regions of the leading end of the electronic component welding portion 18 (with respect to the connection portion). Thus, the electronic-component-connection bus bar is easily deformable and is capable of reliably preventing disconnection of the lead wires of the electronic components. For example, if two electronic components are arranged at a relative angle of 180 degrees along different directions as shown in FIG. 5D, the opposite ends of the electronic component welding portion receive stresses acting in the opposite directions. Thus, the connection portion is deformed by a twisting force. That is to say, the opposite ends of the electronic component welding portion are simultaneously deformed in the opposite directions. This makes it possible to further reduce the possibility of disconnection of the lead wires of the electronic components. The term "different directions" referred to herein means that, with respect to a straight line joining the welding points X and Y, one of the electronic components is oriented in one direction and the other is oriented in another direction. The connection portion 20 preferably has a uniform or substantially uniform width B along the axial direction. The width of the electronic component welding portion 18 is larger than the width of the connection portion 20. With this structure, the welding points are configured to be specified with ease and the distance between the welding points is made larger. Thus, the electronic-component-connection bus bar is easily deformable and is capable of reliably preventing disconnection of the lead wires of the electronic components. Preferably, the distance A between the welding points X and Y is about 1.2 times or more as large as the width (B or B+C) of the thinnest section of the connection portion 20, for example. With this structure, the electronic-component-connection bus bar 17 is more easily deformable and is capable of more reliably preventing disconnection of the lead wires of the electronic components. When seen in a plan view, the welding points X and Y preferably do not overlap with the thinnest section of the connection portion 20. With this structure, the electronic-component-connection bus bar is more easily deformable and is capable of more reliably preventing disconnection of the lead wires of the electronic components.

Referring to FIG. 4B, the welding points X and Y may be positioned in the opposite lateral regions of the leading end of the electronic component welding portion 18 (with respect to the connection portion 20). The connection portion 20 preferably has a non-uniform width. The thinnest section of the connection portion 20 is positioned closer to the base portion 19. When seen in a plan view, the welding points X and Y preferably do not overlap with the thinnest section of the connection portion 20.

Referring to FIG. 4C, the welding points X and Y may be positioned in the opposite lateral regions of the leading end of the electronic component welding portion 18 (with respect to the connection portion 20). The connection portion 20 has a non-uniform width. The thinnest section of the connection portion 20 is positioned at the axial center of the connection portion 20. When seen in a plan view, the welding points X and Y do not overlap with the thinnest section of the connection portion 20.

Referring to FIG. 4D, the welding points X and Y may be positioned in one lateral region of the leading end of the electronic component welding portion 18 (in one lateral region more outward than the connection portion 20). The connection portion 20 preferably has a substantially uniform width. The width of the electronic component welding portion 18 is larger than the width of the connection portion 20. When seen in a plan view, the welding points X and Y preferably do not overlap with the thinnest section of the connection portion 20.

Referring to FIGS. 4E and 4F, the electronic-component-connection bus bar 17 includes a plurality of connection portions. As shown in FIGS. 4E and 4F, the electronic-component-connection bus bar 17 preferably includes two adjoining connection portions 20 and 20'. The distance between the adjoining welding points X and Y is assumed to be A. The widths of the thinnest sections of the adjoining connection portions 20 and 20' are assumed to be B and C. The distance A is larger than the sum of the widths B and C. The electronic-component-connection bus bar 17 of this structure is easily deformable and is capable of reliably preventing disconnection of the lead wires of the electronic components. When seen in a plan view, the welding points X and Y do not overlap with the thinnest sections of the connection portions 20 and 20'.

Referring to FIGS. 4G and 4H, the electronic-component-connection bus bar 17 includes a plurality of connection portions. As shown in FIGS. 4G and 4H, the electronic-component-connection bus bar 17 preferably includes two adjoining connection portions 20 and 20'. The electronic-component-connection bus bar 17 preferably includes a cutout 21 positioned between the adjoining welding points X and Y. When seen in a plan view, the welding points X and Y preferably do not overlap with the thinnest sections of the connection portions 20 and 20'. As shown in FIG. 4G, the welding points X and Y are positioned closer to the cutout 21 than the connection portions 20 and 20'. The electronic-component-connection bus bar of this structure is easily deformable and is capable of reliably preventing disconnection of the lead wires of the electronic components.

Referring to FIG. 5A, the extension directions of the lead wires 22 and 23 are preferably coincident or substantially coincident with each other. Referring to FIG. 5B, the extension directions of the lead wires 22 and 23 define an acute angle with each other. Referring to FIG. 5C, the extension directions of the lead wires 22 and 23 define an obtuse angle with each other. Referring to FIG. 5D, the extension directions of the lead wires 22 and 23 define an angle of 180 degrees with each other. In this case, the opposite ends of the electronic component welding portion receive stresses acting in the opposite directions. Thus, the connection portion is deformed by a twisting force. That is to say, the opposite ends of the electronic component welding portion are preferably simultaneously deformed in the opposite directions. This makes it possible to further reduce the possibility of disconnection of the lead wires of the electronic components. If the electronic components are disposed to extend in different directions, the electronic-component-connection bus bar of various preferred embodiments of the present invention is easily deformable in different directions and is capable of maintaining the bonding strength and capable of preventing disconnection of the lead wires.

FIG. 6 is a sectional view showing a portion of the bus bar holding member 7 of the motor 1 shown in FIG. 2. As shown in FIG. 6, the bus bar holding member 7 preferably includes a terminal stand 24 arranged to hold the electronic-component-connection bus bar 17. The terminal stand 24 includes a through-hole 25 arranged to hold the connection portion 20 of the electronic-component-connection bus bar 17. At least the leading end 18a of the electronic component welding portion 18 is exposed through the upper end of the through-hole 25 so that the electronic components are capable of being easily welded to the leading end 18a of the electronic component welding portion 18. When seen in a sectional view, the through-hole 25 preferably has a taper-shaped structure in which the width of the through-hole 25 grows larger toward the upper end of the through-hole 25. With this structure, the electronic-component-connection bus bar 17 is easily inserted into the through-hole 25. Since the through-hole 25 preferably has a taper-shaped structure, the electronic component welding portion positioned at the upper end of the through-hole 25 is easily deformed when the electronic-component-connection bus bar receives a pulling force from the electronic components. This makes it possible to prevent disconnection of the lead wires of the electronic components.

The preferred embodiments of the present invention provide at least the following advantages.

In the preferred embodiments, the welding points are preferably positioned in the opposite lateral regions of the electronic component welding portion. Thus, the electronic-component-connection bus bar is easily deformable and is capable of reliably preventing disconnection of the lead wires of the electronic components.

In the preferred embodiments, the electronic components are preferably disposed to extend in different directions. Thus, the electronic-component-connection bus bar of various preferred embodiments of the present invention is easily deformable and is capable of reliably preventing disconnection of the lead wires of the electronic components disposed along different directions.

In the preferred embodiments, when seen in a plan view, the adjoining welding points preferably do not overlap with the thinnest section of the connection portion. Thus, the electronic-component-connection bus bar is easily deformable and is capable of reliably preventing disconnection of the lead wires of the electronic components.

In the preferred embodiments, when seen in a plan view, the width of electronic component welding portion is preferably larger than the width of the connection portion. With this structure, the welding points are capable of being specified with ease and the distance between the adjoining welding points can be made larger. Thus, the electronic-component-connection bus bar is easily deformable and is capable of reliably preventing disconnection of the lead wires of the electronic components.

In the preferred embodiments, the thinnest section of the connection portion is positioned at the axial center of the connection portion. This makes it possible to provide another structure of the connection portion.

In the preferred embodiments, the thinnest section of the connection portion is preferably positioned closer to the base portion. This makes it possible to provide a further structure of the connection portion.

In the preferred embodiments, the electronic-component-connection bus bar includes a plurality of connection portions. The distance between the adjoining welding points is preferably larger than the sum of the widths of the thinnest sections of the adjoining connection portions. With the structure, the electronic-component-connection bus bar is easily deformable and is capable of reliably preventing disconnection of the lead wires of the electronic components.

In the preferred embodiments, the electronic-component-connection bus bar includes a plurality of connection portions and preferably includes a cutout between the adjoining welding points. Thus, the electronic-component-connection bus bar is easily deformable and is capable of reliably preventing disconnection of the lead wires of the electronic components.

In the preferred embodiments, the welding points are preferably positioned closer to the cutout than the connection portions. Thus, the electronic-component-connection bus bar is easily deformable and is capable of reliably preventing disconnection of the lead wires of the electronic components.

In the preferred embodiments, the bus bar holding member preferably includes a terminal stand configured to hold the electronic-component-connection bus bar. The terminal stand includes a through-hole configured to hold the connection portion of the electronic-component-connection bus bar. The electronic component welding portion is exposed through the upper end of the through-hole. When seen in a sectional view, the through-hole preferably has a taper-shaped structure in which the width of the through-hole grows larger toward the upper end of the through-hole. With this structure, the electronic-component-connection bus bar is easily inserted into the through-hole. Since the through-hole preferably has a taper-shaped structure, the electronic component welding portion positioned at the upper end of the through-hole is easily deformed when the electronic-component-connection bus bar receives a pulling force from the electronic components. This makes it possible to prevent disconnection of the lead wires of the electronic components.

In the preferred embodiments, the distance between the adjoining welding points is preferably about 1.2 times or more as large as the width of the thinnest section of the connection portion, for example. Thus, the electronic-component-connection bus bar is easily deformable and is capable of reliably preventing disconnection of the lead wires of the electronic components.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
   a stator around which an armature coil is wound;
   a bus bar unit including a coil-connection bus bar electrically connected to the armature coil and an electronic-component-connection bus bar to which a plurality of electronic components is welded; and
   a bus bar holding member configured to hold the bus bar unit; wherein
   the electronic-component-connection bus bar includes an electronic component welding portion including a plurality of welding points at which the electronic components are welded to a leading end of the electronic component welding portion, a base portion held by the bus bar holding member, and a connection portion configured to interconnect the electronic component welding portion and the base portion, a distance between the welding points adjoining each other being larger than a width of a thinnest section of the connection portion.

2. The motor of claim 1, wherein the welding points are positioned in opposite lateral regions of the electronic component welding portion.

3. The motor of claim 1, wherein the electronic components extend in different directions.

4. The motor of claim 1, wherein, when seen in a plan view, the welding points adjoining each other do not overlap with the thinnest section of the connection portion.

5. The motor of claim 1, wherein, when seen in a sectional view, a width of the electronic component welding portion is larger than a width of the connection portion.

6. The motor of claim 1, wherein the thinnest section of the connection portion is positioned at an axial center of the connection portion.

7. The motor of claim 1, wherein the thinnest section of the connection portion is positioned closer to the base portion.

8. The motor of claim 1, wherein the electronic-component-connection bus bar includes a plurality of the connection portions, and the distance between the welding points adjoining each other is larger than a sum of widths of thinnest sections of the connection portions.

9. The motor of claim 1, wherein the electronic-component-connection bus bar includes a plurality of the connection portions, and the electronic-component-connection bus bar includes a cutout arranged between the welding points adjoining each other.

10. The motor of claim 9, wherein the welding points are positioned closer to the cutout than the connection portions.

11. The motor of claim 1, wherein the bus bar holding member includes a terminal stand configured to hold the electronic-component-connection bus bar, the terminal stand including a through-hole arranged to surround the connection portion of the electronic-component-connection bus bar, the electronic component welding portion exposed through the through-hole, the through-hole having a taper-shaped structure in which a width of the through-hole grows larger toward an upper end of the through-hole when seen in a sectional view.

12. The motor of claim 1, wherein the distance between the welding points adjoining each other is about 1.2 times or more as large as the width of the thinnest section of the connection portion.

* * * * *